US007887224B2

(12) United States Patent
Theelen et al.

(10) Patent No.: US 7,887,224 B2
(45) Date of Patent: Feb. 15, 2011

(54) AUTOMOTIVE LAMP PROVIDED WITH A BULB LOCKED TO THE CAP OF THE LAMP

(75) Inventors: Antonius Nicolaas Theelen, Eindhoven (NL); Vanessa Doree, Palaiseau (FR); Philippe Riou, Muzy (FR); Jelle Pelsma, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 218 days.

(21) Appl. No.: 12/282,181

(22) PCT Filed: Mar. 6, 2007

(86) PCT No.: PCT/IB2007/050737

§ 371 (c)(1),
(2), (4) Date: Sep. 9, 2008

(87) PCT Pub. No.: WO2007/105144

PCT Pub. Date: Sep. 20, 2007

(65) Prior Publication Data

US 2009/0073714 A1 Mar. 19, 2009

(30) Foreign Application Priority Data

Mar. 10, 2006 (EP) ................................ 06110942

(51) Int. Cl.
*B60Q 1/00* (2006.01)

(52) U.S. Cl. ...................................... 362/549; 362/548

(58) Field of Classification Search ................. 362/548, 362/549, 519, 546, 652, 655, 656, 457, 429, 362/374, 375
See application file for complete search history.

(56) References Cited

U.S. PATENT DOCUMENTS

| | | | | |
|---|---|---|---|---|
| 3,775,731 | A | 11/1973 | Merki et al. | |
| 6,083,050 | A * | 7/2000 | Hsu | 439/619 |
| 6,139,334 | A | 10/2000 | Forish et al. | |
| 6,217,340 | B1 | 4/2001 | Gordon | |
| 6,467,942 | B2 * | 10/2002 | Alloway et al. | 362/549 |
| 7,284,895 | B2 * | 10/2007 | Goto | 362/645 |
| 2005/0041420 | A1 * | 2/2005 | Tiesler-Wittig et al. | 362/457 |

* cited by examiner

*Primary Examiner*—Bao Q Truong

(57) ABSTRACT

An automotive lamp includes a translucent bulb containing a light source and a cap that surrounds a portion of the bulb such that it engages the bulb by a click connection. The lamp includes a connection member for connecting the lamp to a lamp holder. The connection member is non-detachably connected to the cap, for example, by an ultrasonic welding operation, and locks the click connection.

14 Claims, 3 Drawing Sheets

AUTOMOTIVE LAMP PROVIDED WITH A BULB LOCKED TO THE CAP OF THE LAMP

The invention relates to an automotive lamp comprising a translucent bulb containing a light source and a cap that surrounds a portion of the bulb so as to engage the bulb by means of a click connection.

Translucent is to be understood as to comprise both transparent and diffusely transparent.

The expression 'click connection' means that a portion of the cap extends behind a cooperating portion of the bulb, such that the cap can only be removed from the bulb by deformation of resilient material of the cap while said portion of the cap moves away from said cooperating portion of the bulb. To connect the cap to the bulb, the bulb is inserted into the cap, whereby resilient material of the cap is deformed. The deformed material of the cap returns to its original shape when the bulb is in its final position with respect to the cap, wherein the cap engages the bulb as described above.

An automotive lamp whose lamp bulb is engaged by the cap by means of such a click connection is described in WO-2004/015331. The cap described therein is provided with resilient tongues with small protuberances for securely retaining the bulb of the lamp. The resilient tongues surround a portion of the bulb, so that the protuberances engage the bulb. The cap of the lamp can be removed from the bulb, for which the tongues have to be moved outwards, against the resilient force of the material of the tongues. The cap of the lamp is furthermore provided with means for connecting the lamp to a lampholder, for example the back plate of a lamp unit of an automobile or other vehicle.

The lamp is intended to be used in a lamp unit, including a reflector, of an automobile, for example as a tail lamp or as a braking lamp. The light source in the bulb may be of any type, for example a halogen lamp. The cap may be formed as one single part from a thermoplastic resin, for example polyamide. This material has a sufficient resilience and can withstand the relatively high temperatures that are generated by the lamp in use. The cap may alternatively be formed as a synthetic resin part with metal tongues that carry said small protuberances.

In general, different kinds of lamps are to be installed in the lamp unit of an automobile, such as a tail lamp, a braking lamp, a direction indicator lamp, a reverse drive lamp. There are several different lampholders in the lamp unit, and each lampholder must be capable of matching a predetermined kind of lamp only. Therefore, each kind of lamp is provided with a unique connection means (key elements) corresponding to the shape of the matching lamp holder. Thus the cap of the lamp must be provided with key elements according to the kind of lamp.

A disadvantage of the lamp as described in WO-2004/015331 is the possibility to disassemble the lamp, i.e. to separate the bulb and the cap from each other. The result of this is that the bulb of a certain kind of lamp can be replaced by the bulb of another kind of lamp, so that a lamp is created in which the unique connection means (the key elements) of the cap do not correspond to the kind of lamp. Such a lamp can be placed in an incorrect location in the lamp unit of the automobile.

An object of the invention is an automotive lamp comprising a translucent bulb containing a light source, and a cap engaging the bulb by means of a click connection and provided with connection means adapted to the kind of lamp, i.e. provided with key elements, wherein the bulb and the cap with the connection means cannot be disassembled.

To achieve this object, the lamp comprises a connection member for connecting the lamp to a lampholder, which connection member is non-detachably connected to the cap and, furthermore, locks said click connection. The assembly of the lamp occurs in two steps:

firstly, the lamp bulb is inserted in an axial direction into a cavity of the cap, which cavity is surrounded by an annular wall (interrupted by axially extending slits) of the cap, and secondly, the cap is inserted along the axial direction in the lamp connection member.

Finally, mounting and electrical connection of the lamp is realized by insertion of the assembled lamp in the lampholder. In order to lock the click connection, the connection member prevents deformation of the material of the cap at the location where such deformation results in releasing the click connection. Such a locking function can be achieved when rigid portions of the connection member are located adjacent to resilient portions of the cap, whereby a displacement of the connection member with respect to the cap is made impossible.

In a preferred embodiment, the connection member is secured to the cap by means of glue, in which case the cap and the connection member can be made of different materials, provided that the glue cooperates with both materials.

In another preferred embodiment, the connection member is secured to the cap by means of a welding operation, preferably an ultrasonic welding operation. Such ultrasonic welding operations are well known and can be readily performed in a relatively short period of time during the assembling operation of the lamp.

Preferably, the cap is formed as one single part of resilient material, so that at least the portions of the cap that have to be deformed have a relatively small thickness. In a preferred embodiment of the lamp, the connection member surrounds a main portion of the cap, while at least parts of the click connection are covered by the connection member.

In a further embodiment, the connection member carries key elements, so that the connection member exclusively matches a predetermined lamp holder. When the key elements are carried by the connection member, the caps of all kinds of lamps can be identical, only the connection members of the different kind of lamps being different in order to form unique connection means for each kind of lamp.

In a yet further embodiment, the connection member has a substantially tubular shape, the cap being present at one end of the tube, and a connector element can be inserted into the other end of the tube in order to make electrical contact with the lead wires of the lamp. The connection member can thus keep said connector element in its contacting position. The tubular shape may be interrupted by a wall, so that the spaces at the two ends inside the tube are mutually separated. The lead wires for supplying electric power to the light source of the lamp can be passed through openings in the wall.

In a yet further preferred embodiment the automotive lamp must fulfill legal regulation requirements which requirements involve that the bulb must be a non-replaceable bulb. Although in the embodiments discussed so far the replaceability of the bulb is counteracted in that the cap is non-detachably connected to the connection member, it appeared that the glass bulb is still releasable from to the cap due to flexible part of the wall of the cap. To counteract the releasability of the bulb from the cap the slits in the annular wall of the cap are shifted in a tangential direction. The extent of the shift is such that:

a) the clicks no longer are flat, flexible parts of the annular wall of the cap, but rather are three-dimensional, less-flexible annular wall parts, and b) viewed in radial direction there is an overlap of the wall of the connection member with the (flexible) click parts of the wall of the cap in tangential direction.

Said connection member wall is bonded, for example via ultrasonic welding, to the less-flexible annular wall part of the cap. This ensures that the connection member is bonded to the cap, and renders the cap to be relatively stiff so that the bulb is held with a much higher force. When the clicks of the cap are bonded to the clicks of the connection member, a rigid ring is created as the bonding of the connection member to the cap is done at the location where the wall of the connection member overlaps and touches the clicks of the cap. The rigid ring completely fixes all the clicks and prevents that the clicks of the cap can be bend in radial direction when a force is applied on burner.

The invention furthermore relates to a method of assembling an automotive lamp, whereby a translucent bulb containing a light source is connected to a cap that surrounds a portion of the bulb so as to engage the bulb by means of a click connection, and whereby a connection member for connecting the lamp to a lamp holder is non-detachably connected to the cap, such that it locks said click connection.

The invention will now be further elucidated by means of a description of an embodiment of an automotive lamp comprising a bulb and a cap and a connection member with reference to the drawing representing a number of perspective views, wherein.

The Figures are diagrammatic representations, showing only those parts that are relevant for elucidating the invention.

Figure 1:
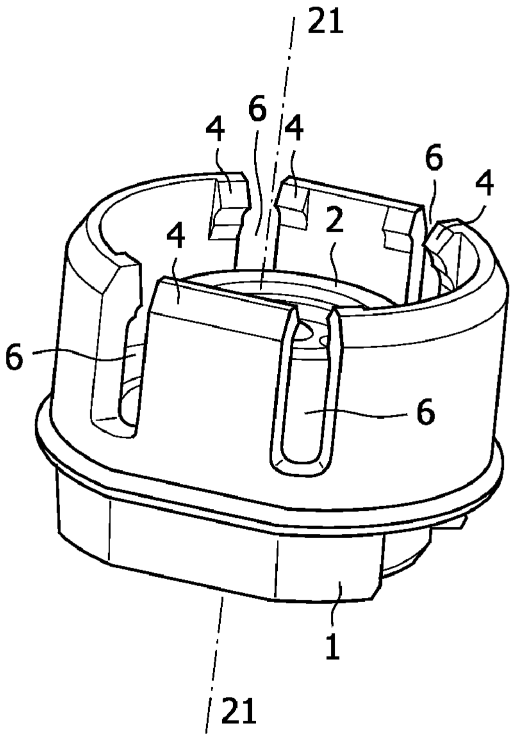
FIG. 1 shows the cap of the automotive lamp.
Figure 2:
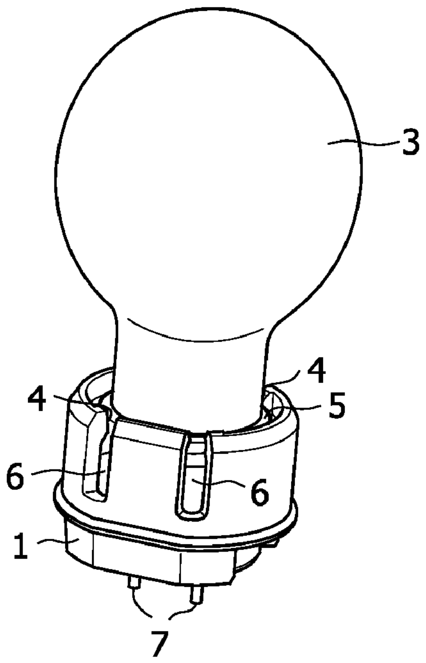
FIG. 2 shows the cap attached to the bulb of the lamp.

FIG. 1 shows the cap 1 of the automotive lamp, which cap 1 is formed as one single part from polyamide, which is a thermoplastic resin that is resilient and that can withstand the relatively high temperatures generated by the lamp in use. The cap 1 has an annular surface 2 for supporting the bulb 3 of the lamp when the bulb 3 is connected to the cap 1, as is shown in FIG. 2. The cap 1 is provided with eight protuberances 4 for engaging the bulb 3 of the lamp. In order to be engaged, the bulb 3 is provided with a flange 5 which rests with one of its sides on the annular surface 2, while the protuberances 4 of the cap 1 engage the other side of the flange 5 in order to fix the bulb 3 to the cap 1 of the lamp.

For connecting the bulb 3 to the cap 1, the flange 5 of the bulb 3 is inserted along axis 21 into the cap 1, which temporarily deforms the resilient material of the cap 1 so that the protuberances 4 move outwards. The deformed material of the cap 1 returns to its original shape when the bulb 3 is in its final position with respect to the cap 1, the flange 5 of the bulb 3 then resting on the annular surface 2 of the cap 1. The four slits 6 in the material of the cap 1 increase the flexibility of the portions of the cap 1 where the protuberances 4 are located.

The connection between the bulb 3 and the cap 1, with the protuberances 4 of the cap 1 extending behind the flange 5 of the bulb 3, is called a click connection. The bulb 3 can be released from the cap 1 by deforming the material of the cap 1 such that the protuberances 4 are moved outwards, so that the flange 5 can pass between the protuberances 4.

The bulb 3 is provided with two lead wires 7 in order to supply electric power to the light source in the bulb 3. The cap 1 is provided with holes, so that the two lead wires 7 can extend through the cap 1 to outside the cap 1.

Figure 3:
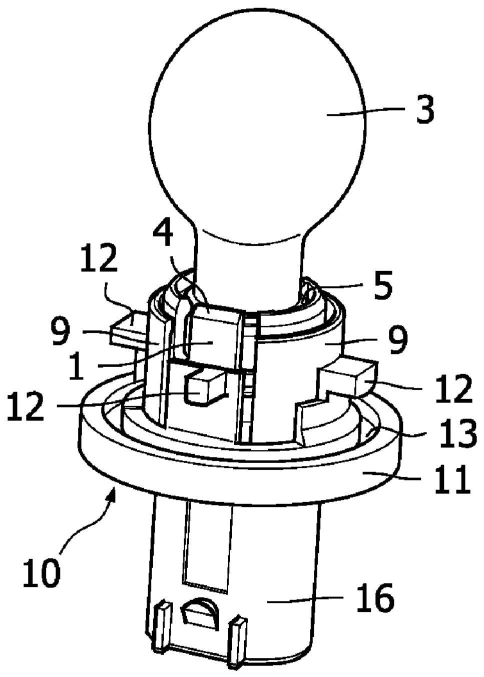
FIG. 3 shows the complete automotive lamp.

FIG. 3 shows the complete lamp, a connection member 10 being attached to the lamp cap 1. The connection member 10 comprises a portion 9 surrounding the cap 1 and a flange 13 that can abut against the lampholder, for example the back plate of an automotive lamp unit. Said back plate is provided with an opening, and bulb 3 and portion 9 can be inserted into the lamp unit from the rear of the lamp unit through said opening. Portion 9 carries four protrusions 12, which are key elements having a certain shape matching that of corresponding recesses in the back plate of the lamp unit, so that only a lamp with these key elements can be inserted into the lamp holder for that particular type of lamp.

The lamp can be fixed in the back plate of the lamp unit by means of a bayonet connection, where one or more of the protrusions 12 act as pins for the bayonet connection, which bayonet connection is well known in the art. Flange 13 is provided with an annular rubber ring 11 around its outer edge, forming a seal between the lamp and the lampholder.

Figure 4:
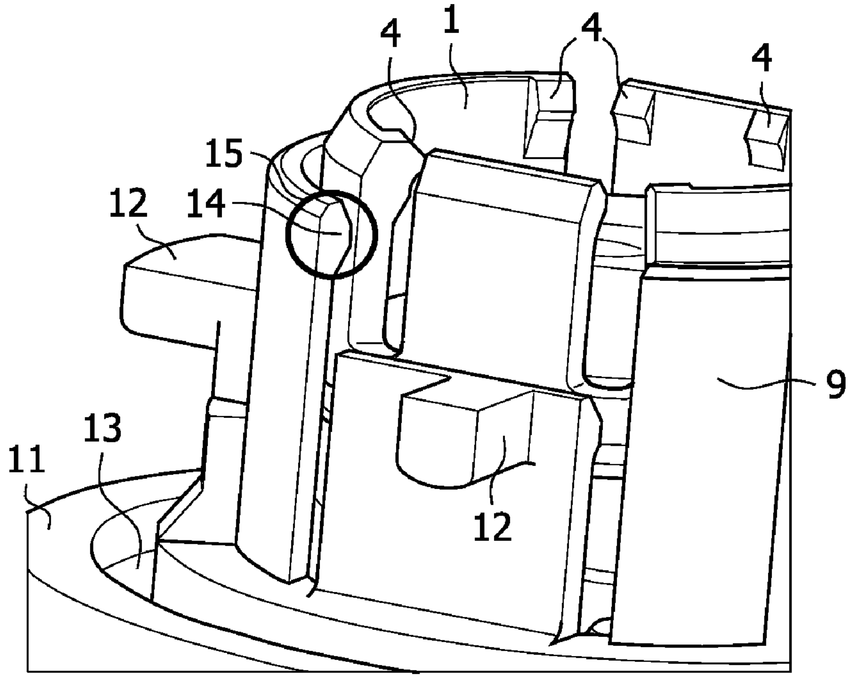
FIG. 4 is an enlarged view of a portion of a first embodiment the connection member with cap.

FIG. 4 represents a portion of FIG. 3 on an enlarged scale and without the bulb 3, in order to show the fixation of the connection member 10 to the cap 1. Connection member 10 and cap 1 are connected to each other by means of an ultrasonic welding operation, whereby material of the connection member 10 is fused together with material of the cap 1. The weld 14 between connection member 10 and cap 1 is shown in the circle 15 in FIG. 4. After the welding operation the connection member 10 cannot be removed anymore from the cap 1. Furthermore, cap 1 cannot easily be deformed anymore because portion 9 of the connection member 10 surrounds the cap 1 and prevents the protuberances 4 from moving outwards, so that the flange 5 of the bulb 3 is securely engaged. So, the bulb 3 cannot easily be separated from the cap 1, and the lamp cannot easily be disassembled anymore.

Figure 5:
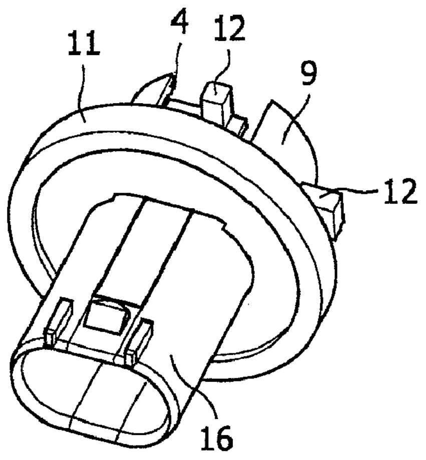
FIG. 5 is a perspective view of the connection member.

FIG. 5 represents the connection member 10 in a different perspective view, wherein the tubular portion 16 is shown. The tubular portion 16 of the connection member 10 is accessible from the rear of the lampholder, and a connector element (not shown) can be inserted into portion 16 in order to contact the two lead wires 7 (FIG. 2), so that the light source of the lamp can be supplied with electric power.

Figure 6:
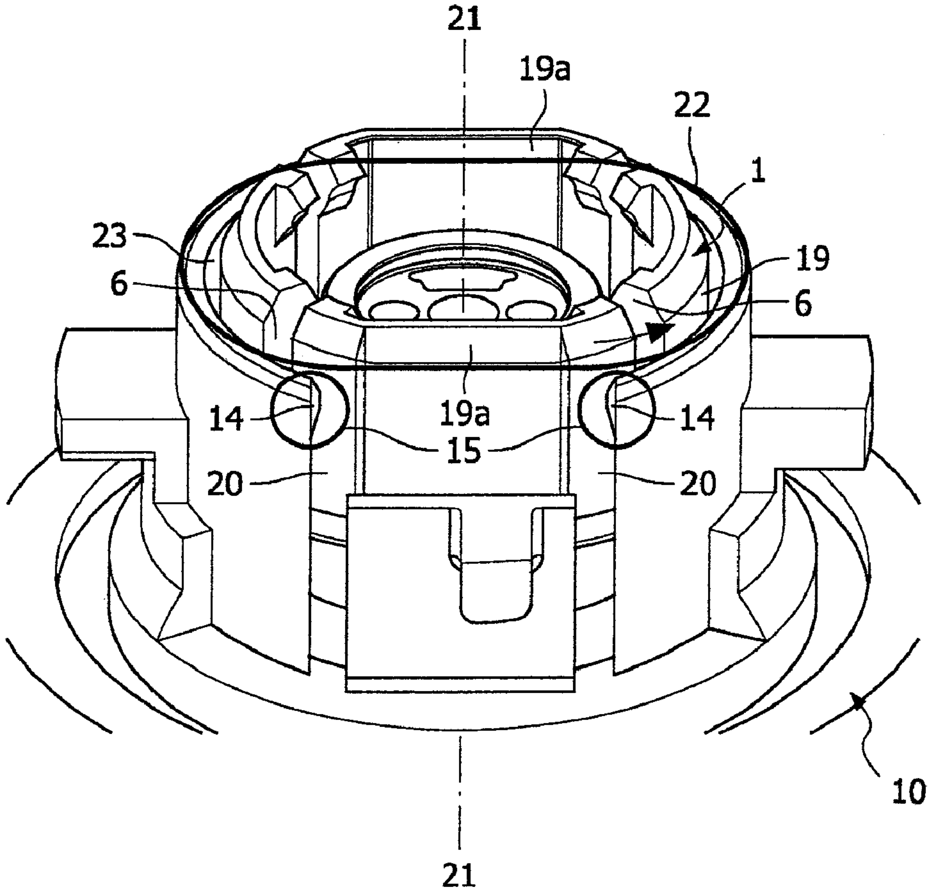
FIG. 6 shows an enlarged view of a portion of another embodiment of the connection member with cap.

In FIG. 6 shows on an enlarged scale and without the bulb a portion of the connection member with cap 1 inserted along axis 21 in the cavity 23 of the connection member, in order to show the fixation of the connection member 10 to the cap 1. Connection member 1 and cap 10 are connected to each other by means of an ultrasonic welding operation, whereby material of the connection member 10 is fused to material of the cap 1. The weld 14 between connection member 10 and cap 1 is shown in the circle 15 in FIG. 6. After the welding operation the connection member 10 cannot be removed anymore from the cap 1. Furthermore, cap 1 cannot be deformed sufficiently anymore to enable disassembly of the bulb and cap 1, because not only portion 9 of the connection member 10 surrounds the cap 1, but additionally the slits 6 in the annular wall 19 of the cap are shifted in a tangential direction. The extent of the shift is such that:

a) the clicks are three-dimensional, less-flexible annular wall parts 19*a* of the annular wall 19 of the cap 1, and b) there is a tangential overlap 20 of the wall of the connection member 10 with the (flexible) click parts of the wall of the cap 1, viewed in radial direction.

When the clicks 19*a* of the cap are bonded via the welds 14 to the connection member 10, a rigid ring, schematically indicated by ring 22, is created as the bonding of the connection member 10 to the cap 1 is done at the overlap location 20 of the wall of the cap 1 and the wall of the connection member 10, and where both wall touches each other. As a result the protuberances 4 are prevented from be able to move radially outwards with respect to axis 21, so that the flange 5 of the bulb 3 (both not shown in FIG. 6) is permanently engaged. So, the bulb cannot be separated from the cap 1, and the lamp cannot be disassembled anymore. The rigid ring completely fixes all the clicks and prevents that the clicks of the cap 1 can be bend in radial direction when a force is applied on the bulb.

The embodiment of the lamp as described above is only an example of an automotive lamp according to the invention. The invention is not limited to automotive lamps only, but applies as well to many other embodiments where bulbs are clicked in caps or capped lamps are clicked in holders and/or connection members. Examples of general lighting are for example capped halogen reflector lamps.

The invention claimed is:

1. An automotive lamp comprising:

a bulb containing a light source;

a cap that receives a portion of the bulb such that the cap engages the bulb by a click connection; and a connection member that receives the cap including the bulb and connects the lamp to a lamp holder, wherein the connection member is non-detachably connected to the cap and locks the click connection and the bulb cannot be removed from the cap after insertion of the bulb in the cap and insertion of the cap in the connection member.

2. The automotive lamp as claimed in claim 1, wherein the connection member is secured to the cap by glue.

3. The automotive lamp as claimed in claim 1, wherein the connection member is secured to the cap by weld.

4. The automotive lamp as claimed in claim 1, wherein the connection member is connected to the cap an ultrasonic weld.

5. The automotive lamp as claimed in claim 1, wherein the cap is formed as one single part of resilient material.

6. The automotive lamp as claimed in claim 1, wherein the connection member surrounds a main portion of the cap.

7. The automotive lamp as claimed in claim 1, wherein the connection member carries key elements so that the connection member uniquely matches the lamp holder.

8. The automotive lamp as claimed in claim 1, wherein the connection member has a substantially a shape of a tube, the cap being present at one end of the tube, and a connector element can be inserted into another end of the tube in order to make electrical contact with lead wires of the lamp.

9. The automotive lamp as claimed in claim 1, wherein an annular wall of the cap includes slits and wherein the slits are shifted in a tangential direction with respect to an axis, an extent of the shift being such that wall parts of the annular wall form three-dimensional, less-flexible annular click parts of the cap, and that viewed in radial direction there is an overlap in tangential direction of a wall of the connection member with the click parts.

10. A method of assembling an automotive lamp comprising the acts of:

inserting a bulb containing a light source in a cap that surrounds a portion of the bulb such that the cap engages the bulb by a click connection;

inserting the cap including the bulb in a connection member; and permanently fixing the cap to the connection member for non-detachably connecting the connection member to the cap and locking the click connection, wherein after the permanently fixing act, the bulb cannot be removed from the cap.

11. The automotive lamp of claim 1, wherein the cap includes walls including a portion of the click connection and having slits for allowing deformation of the walls when the bulb is inserted in the cap to move away from the bulb when the bulb in inserted in the cap, and wherein the walls of the cap are non-detachably connected to the connection member after insertion of cap including the bulb in the connection member to prevent the deformation of the walls including preventing removal of the bulb from the cap and preventing removal of the cap from the connection member.

12. The method of claim 10, wherein the permanently fixing act includes gluing the cap to the connection member.

13. The method of claim 10, wherein the permanently fixing act includes soldering the cap to the connection member.

14. The method of claim 10, wherein the cap includes walls having slits for allowing deformation of the walls to move away from the bulb when the bulb in inserted in the cap, and wherein the permanently fixing act non-detachably connects the walls to the connection member to prevent the deformation of the walls including preventing removal of the bulb from the cap and preventing removal of the cap from the connection member.

* * * * *